United States Patent [19]

Rogler et al.

[11] Patent Number: 5,032,453

[45] Date of Patent: Jul. 16, 1991

[54] INSULATING TAPE FOR MAKING AN IMPREGNATED INSULATING SLEEVE FOR ELECTRIC CONDUCTORS

[75] Inventors: Wolfgang Rogler, Moehrendorf; Walter Ihlein; Guenter Suchardt, both of Berlin, all of Fed. Rep. of Germany

[73] Assignee: Siemens Aktiengesellschaft, Berlin & Munich, Fed. Rep. of Germany

[21] Appl. No.: 395,763

[22] Filed: Aug. 18, 1989

[30] Foreign Application Priority Data

Aug. 18, 1988 [DE] Fed. Rep. of Germany ....... 3828092

[51] Int. Cl.$^5$ .......................... B32B 5/16; B32B 27/38
[52] U.S. Cl. .................................... 428/324; 428/413; 428/473.5; 428/241; 428/363; 428/417; 428/454
[58] Field of Search ...................... 428/324, 413, 473.5, 428/241, 363, 454, 417

[56] References Cited

U.S. PATENT DOCUMENTS

| | | | |
|---|---|---|---|
| 3,179,623 | 4/1965 | Bowen | 260/47 |
| 3,647,611 | 3/1972 | Mertens | 161/163 |
| 3,841,959 | 10/1974 | Mertens | 161/163 |
| 4,336,302 | 6/1982 | Ihlein | 428/324 |

*Primary Examiner*—P. C. Sluby
*Attorney, Agent, or Firm*—Kenyon & Kenyon

[57] ABSTRACT

Insulating tape for making an impregnated insulating sleeve for electric conductors. An insulating tape based on breakdown-proof inorganic material and a bonding agent/accelerator mixture is developed in such a manner that, by means of heat-hardening impregnating resins, insulating sleeves for electric conductors with improved thermal-mechanical properties can be made therefrom. To this end, the bonding agent/accelerator mixture is a mixture of an epoxy resin/(meth) acrylic acid adduct, a bismaleimide resin and an adduct of a secondary amine and a polyfunctional (meth) acrylic acid ester which may optionally contain an organic peroxide.

19 Claims, No Drawings

INSULATING TAPE FOR MAKING AN IMPREGNATED INSULATING SLEEVE FOR ELECTRIC CONDUCTORS

FIELD OF THE INVENTION

The invention relates to an insulating tape for making an insulating sleeve for electric conductors, impregnated with an impregnating resin in the form of a heat-hardening reaction resin mixture. The insulating sleeve is especially useful for the winding bars or coils of electric machines. More specifically, the invention relates to an insulating tape consisting of a breakdown-proof inorganic material applied to a flexible base, such as mica leaves or fine mica layers, which is cemented to the base and to each other and optionally to a terminating cover layer by means of a bonding agent, which contains an accelerator stimulating the hardening reaction of the impregnating resin, where there bonding agent/accelerator mixture forms a system which is self-hardening at the hardening temperature of the impregnating resin.

BACKGROUND OF THE INVENTION

Insulating tapes, which are known, for instance, from German Patents Nos. 18 01 053, 21 42 571 and 30 03 477 for the impregnation with epoxy resin/acid anhydride hardener mixtures, make it possible to carry out the impregnation economically since a slow-reacting impregnating resin can be used which is practically subject to no change of the viscosity, also at impregnating temperatures which assure a thorough impregnation of the insulating sleeve. This is necessary because only a small percentage of the reaction resin mixture used as the impregnating resin penetrates into the insulating sleeve while the rest must be reused for a new impregnation. For this reason, the insulating tape contains an accelerator which stimulates the hardening reaction of the impregnating resin so that the share of the impregnating resin which has penetrated into the insulating sleeve hardens in an economically justifiable time.

According to German Patent No. 18 01 053, the bonding agent/accelerator mixture is chosen so that in the insulating tape practically no hardening of this mixture takes place at room temperature. In this way the insulating tapes can be stored for a long time before being impregnated. In addition, the bonding agent/accelerator mixture forms a self-hardening system which self-hardens only at hardening temperatures of the impregnating resin which are substantially higher than room temperature. In this way it is avoided, that bonding agent which has penetrated between large-area layers of the breakdown-proof inorganic material and which could not be resorbed by the impregnating resin completely, remains in the insulation unhardened.

In the insulating tapes according to German Patent No. 21 42 571, cycloaliphatic epoxy resins are used as the bonding agents, in which the epoxy groups were generated by oxygen addition at ring-located double bonds and which, as is generally known, exhibit no or only strongly delayed reactions with amino hardeners or accelerators. If the epoxy/acid anhydride impregnating resin is added, these accelerators, however, develop their full catalytic activity. Glycidyl ethyl, glycidyl ester or N-glycidyl epoxy resins do not exhibit these different reactivities. However, cycloaliphatic epoxy resins can be prepared only with difficulty. In addition, according to more recent investigations, suitable, cycloaliphatic epoxy resins have certain adverse physiological effects.

These disadvantages are taken into account in the insulating tape according to German Patent No. 30 03 477 by the provision that quaternary onium salts are added as accelerators to the glycidyl ether resins used as bonding agents. Insulating tape constructed in accordance with this state of the art can be stored at room temperature for more than three months. However, the usability of the tape can be limited through moisture absorption of the tape due to the hygroscopic nature of the onium salts.

The mica tapes known from the German Patent No. 18 01 053 mentioned above are insulating tapes which have as bonding agents, polymerizable adducts of acid components, which contain at least one radically polymerizable double bond, and epoxy compounds. It is possible to anchor the bonding agent in the heat-hardening impregnating resin system with an epoxy resin base via the hydroxyl groups generated during the addition. By adding suitable organic peroxides to the bonding agent, the double bonds capable of being polymerized can be polymerized radically, whereby self-hardening of the tape adhesive is achieved. As an accelerator for the impregnating resin, this tape adhesive contains zinc salts of unsaturated polymerizable acid compounds.

However, the hardened pure, adhesive resin and the molded material of heat-hardening impregnating resin and mica tape adhesive generated in the hardening, known from the mentioned state of the art, have unsatisfactory thermal-mechanical properties. Thus, a typical molded material of pure adhesive resin such as is described in German Patent No. 18 01 053, has a Martens temperature of about 95° C. The value for a molded material of a suitable epoxy/acid an hydride impregnating resin mixture and the tape adhesive is only slightly higher. The known adhesive resins or the mica tapes made therefrom are therefore suited only for making insulating sleeves of insulation class B.

In rotating machines, the stiffness of the end face insulation contributes to the overall stiffness of the coil head and thus codetermines deformations of the coil head, for instance, in the case of switching and of short circuits. However, the smaller that these deformations are (i.e., the stiffer the insulating sleeve is, the smaller is the danger of damage due to the formation of cracks in this region.

The present state of the art is exemplified, for instance, by high voltage motors which can be stressed thermally up to 155° C. (insulation class F). However, reaction resin molded materials with Martens temperatures <100° C. are not well suited for this purpose, since expensive additional measures for reinforcement are necessary.

It is an object of the invention to provide an insulating tape with a tape adhesive with an epoxy-free base which leads, with heat hardening epoxy impregnating resins, to an insulating sleeve with improved thermal-mechanical properties, particularly greater stiffness.

SUMMARY OF THE INVENTION

According to the invention, an insulating tape is provided wherein the bonding agent/accelerator mixture is a mixture of an epoxy resin/(meth)acrylic acid adduct, a bismaleimide resin and an adduct of a secondary amine and a polyfunctional (meth)acrylic acid ester which optionally contains an organic peroxide.

DETAILED DESCRIPTION OF THE PREFERRED EMBODIMENT

The epoxy resin/(meth)acrylic acid adduct contained in the bonding agent/accelerator mixture has no free epoxy groups. Therefore, a mixture free of epoxide is present which hardens radically. Since the polymerization proceeds radically, the adhesive resin is inert also to the aminic component contained therein (i.e., the adduct of secondary amine and polyfunctional (meth)arcylic acid ester). The aminic component is therefore largely without influence on the storage stability of the adhesive resin.

The epoxy resin/(meth)acrylic acid adducts are reaction products of epoxide resins and acrylic or methacrylic acid, where the epoxy resins are preferably novolak epoxy resins. The reaction takes place in the presence of a catalyst which is preferably a tertiary amine, at temperatures around 70° C. The reaction and the properties of the products obtained in this process are described, for instance, in U.S. Pat. No. 3,179,623. For the subject of the present patent application it is important that the reaction is terminated only when an epoxy functionality can no longer be detected.

The bonding agent/accelerator mixture further contains a bismaleimide resin. The bismaleic imide resin preferably has an aromatic grouping between the imide nitrogen atoms. Such compounds are produced by a reaction of aromatic diamines with maleic acid anhydride. The bismaleimide resin is preferably an N.N'-(methylenedi-p-phenylene)-bismaleimide which is commercially available.

The adduct of secondary amine and polyfunctional (meth)acrylic acid ester (the aminic component), contained in the bonding agent/accelerator mixture, serves as an accelerator in the hardening of the impregnating resin. Such adducts can be prepared in accordance with known methods, where one or several of the (meth)acrylate functions of the (meth)acrylic acid ester are reacted with the secondary amine. Preferably, the adducts comprise free (meth)acrylate functions since such accelerators are incorporated in the molded compound produced in the hardening of the impregnating resin. If, however, all (meth)acrylate functions are reacted with the secondary amine, accelerators are obtained which cannot be incorporated.

Any amines suitable for hardening epoxy impregnating resin systems can serve as secondary amines for the production of the adducts from secondary amine and polyfunctional (meth)acrylic acid ester (i.e., for production of the accelerator). These are, for instance, NH-functional imidazoles such as 2-phenylimidazoles, pyrrolidine, piperidine, N-alkylpiperazine and morpholine, as well as N-methyl octyl amine, methylbenzyl amine, N-methylaniline and diphenyl amine. Preferably, NH-functional imidazoles, N-alkyl piperazine and morpholine are used.

In the preparation of the adducts, the polyfunctional (meth)acrylic acid ester can preferably be trimethylolpropane tri(meth)acrylate. The ratio of secondary amine to trimethylolpropane tri(meth)acrylate used is in the range of from 0.1:1 to 3:1; preferably, the mol ratio is about 1:1 to 2:1.

The bonding agent/accelerator mixture advantageously contains an organic peroxide; the peroxide content is generally from 0.1 to 6 percent by weight and preferably from 0.5 to 3 percent by weight of the bonding agent/accelerator mixture. By the addition of organic peroxides, the adhesion system can be adjusted for self-hardening. If peroxides with suitable decay characteristics are used, adhesive resin components which are not incorporated into the impregnating resin after the impregnating and gelling process can be hardened radically in the post-hardening of the insulating sleeves, for instance, of winding insulations. In this manner it is prevented that thermoplastic regions remain in the insulation. At impregnating temperatures ≦70° C. and post hardening temperatures of maximally 160° C., bis(tert. butyl peroxiiso propyl)-benzol has been found to be suitable. However, it is also possible to release the polymerization without peroxide by a supply of thermal energy.

The content of the epoxy resin/(meth)acrylic acid adduct in the bonding agent/accelerator mixture is advantageously 30 to 70 percent and preferably 40 to 60 percent. The content of the bismaleimide resin is advantageously 5 to 30 percent and preferably 10 to 20 percent. The amount of the adduct of secondary amine and polyfunctional (meth)acrylic acid ester is advantageously 5 to 50 percent, and preferably 20 to 40 percent of the mixture. The shares of the individual components supplement each other to 100 percent.

In order to achieve, on the one hand, an optimum effect of the tape adhesive and, on the other hand, optimum mixing in the impregnating process between the impregnating resin and the tape adhesive, optimum viscosity of the adhesive system is required. For this reason, a reactive thinner is advantageously added to the bonding agent/accelerator mixture. The reactive thinner is preferably a polyacrylate, particularly trimethylolpropane tri(meth)acrylate. The amount of the reactive thinner is generally 5 to 25 percent by weight of the bonding agent/accelerator mixture.

In the production of the insulating tape, the amount of bonding agent used should not be too high so that in the impregnation the impregnating resin can penetrate well into the cavities present in the insulating tape. The weight share of the bonding agent is therefore between 3 and 20 percent by weight of the insulating tape. With such a bonding agent share, the share of accelerator is advantageously in the range between 0.15 and 8 percent by weight of the insulating tape. The amount of the accelerator used depends on how much inorganic material such as mica is present on the base (of the insulating tape) and how high the amount of bonding agent in the insulating tape is. The base (i.e., the carrier for the inorganic material) can be fiber glass, aramide paper ("aramides" are aromatic polyamides of aromatic diamines and arylene dicarboxylic acids), polyimide foil or polyester pleece.

The insulating tape according to the invention can be stored for more than six months at room temperature. In making the insulating sleeve for an electric conductor, for instance, for the winding bars of an electric machine, the insulating tape is wrapped around the winding bars. The "dry" winding (70° C./vacuum) is then impregnated with an impregnating resin. Preferably, the impregnation takes place by the so-called VPI technique (i.e., by vacuum-pressure impregnation). The impregnating resin can be epoxy resin mixtures based on polyfunctional aromatic epoxy compounds, either together with acid anhydrides or together with polyfunctional aromatic isocyanates. Mixture components can be aliphatic or cycloaliphatic glycidyl ether and glycidyl esters as well as unsaturated polymers and monomers. The bonding agent/accelerator mixture according to the invention ensures that all places are hardened in the hardening of the insulating sleeve (i.e., when the impregnating resin is being hardened).

An insulating sleeve produced from the insulating tape according to the invention exhibits excellent thermomechanical properties. These properties are due mainly to the aminic component contained in the adhesive resin which serves to harden the impregnating resin, to the bismaleic imide resin and to the OH functions present in the adhesive resin which lead to a chemical bond between the adhesive resin and the impregnating resin during the hardening. Another advantage of the adhesive resin according to the invention is that it is composed of components without the reservations in toxicological respects.

The invention will be explained in further detail with the aid of the following embodiment examples.

EXAMPLE 1

Preparation of Incorporable Accelerators

For the preparation of accelerators which can be incorporated into the impregnating resin, secondary amines are reacted with trimethylol propane triacrylate (TMPTA). To this end, to TMPTA, stabilized with 0.2 percent hydroquinone, the respective amine is added at temperatures of 50° to 90° C. in such a manner that the reaction temperature can be maintained without heating. After the slightly exothermic reaction has decayed, stirring is continued for 24 hours at 60° C. The secondary amines employed, the amine:TMPTA mol ratio, and the viscosity of the reaction products are listed in Table 1.

EXAMPLE 2

Preparation and Examination of Bonding Agent/Accelerator Mixtures

From an adduct of epoxy novolak and (meth)acrylic acid and the bismaleimide resin N.N'-(methylene di-p-phenylene)-bismaleimide, stable homogeneous mixtures can be produced up to a ratio of 4:1 mass parts (MT). Such mixtures serve as the basis for preparing bonding agent/accelerator mixtures.

In order to achieve optimum reactivity (gelling time) and viscosity, 4:1-mixtures of an epoxy novolak/methacrylic acid adduct ("resin II") and N.N'-(methylenedi-p-phenylene)-bismaleimide ("resin I") were reacted with different amounts of TMPTA and TMPTA/1-EP or TMPTA/2-PI for the preparation of the adhesive resins. The epoxy novolak/methacrylic acid adduct was presented, treated with 0.5 percent hydroquinone and heated to a temperature of 80° to 90° C. while stirring. At this temperature, the bismaleimide resin was added in batches within one hour and was stirred for a total of four to six hours, depending on the composition. Subsequently, TMPTA or TMPTA/amine adduct was added and stirred again for two to three hours until all components were mixed homogeneously.

The composition of the adhesive resins prepared in this manner (i.e., of the bonding agent/accelerator mixtures), the viscosity of these mixtures and their reactivity (i.e., the gelling time) in an impregnating resin on the basis of epoxy/acid anhydride are listed in Table 2.

The gelling times of an adhesive resin in an epoxy/isocyanate impregnating resin (EP/IC-resin) are shown similarly in Table 3.

TABLE 1

| Amine (abbreviation) | Mol ratio of amine:TMPTA | Viscosity, mPa.s at 25° C. |
| --- | --- | --- |
| 2-Isopropylimidazole (2-II) | 1 | 5550 |
| Morpholine (M) | 1 | 900 |
| Piperidine (P) | 0.9 | 1300 |
| 1-Ethylpiperazine (1-EP) | 0.9 | 1070 |
| 2-Phyenylimidazol (2-PI) | 0.9 | 14800 |
| 2-Methylimidazole (2-MI) | 0.9 | — |

TABLE 2

| Adhesive Resin No. | Adhesive Resin Composition (MT) | | | | | Viscosity in mPa.s (at 70° C.) | Gelling Times[1] in the Impregnating Resin[2] in min. at | | | |
| --- | --- | --- | --- | --- | --- | --- | --- | --- | --- | --- |
| | TMPTA/1-EP | TMPTA/2-PI | TMPTA | Resin I | Resin II | | 70° C. | 90° C. | 110° C. | 130° C. |
| 1 | 15 | — | 15 | 10 | 40 | 6000 | 130 | 48 | 15 | 4 |
| 2 | — | 15 | 15 | 10 | 40 | 10100 | 79 | 29 | 10 | 3 |
| 3 | 17.5 | — | 12.5 | 10 | 40 | 6700 | 125 | 37 | 10 | 4 |
| 4 | 20 | — | 10 | 10 | 40 | 6800 | 116 | 35 | 11 | 4 |
| 5 | 25 | — | 5 | 10 | 40 | 11100 | 93 | 30 | 10 | 3 |
| 6 | 30 | — | — | 10 | 40 | 15700 | 83 | 22 | 7 | — |
| 7 | 30 | — | — | — | 50 | 2760 | 75 | — | — | — |

TABLE 3

| Adhesive Resin No. | Adhesive Resin Composition (MT) | | | | Gelling Times[1] in the Impregnating Resin[3] in min. at | | |
| --- | --- | --- | --- | --- | --- | --- | --- |
| | TMPTA/1-EP | TMPTA | Resin I | Resin II | 20° C. | 30° C. | 50° C. |
| 4 | 20 | 10 | 10 | 40 | 50 | 30 | 9 |

[1]Kofler heating bank
[2]Impregnating Resin Composition: Bisphenol A-diglycidyl ether/methylhexa hydrophthalic acid anhydride ratio of impregnating resin: adhesive resin = 100:20 (MT)
[3]Impregnating Resin Composition: Bisphenol A-diglycidyl ether/diphenol methane diisocyanate (EP:IC = 1:4) ratio impregnating resin: adhesive resin = 100:2 (MT)

EXAMPLE 3

Preparation and Examination of Molded Materials of Impregnating Resin and Adhesive Resin For investigating the influence of the composition of the adhesive resins on the properties of molded materials, standard rods of adhesive resin and an epoxy resin hardenable by acid anhydride (EP/SA) or an isocyanate-hardenable epoxy resin (EP/IC) were made. To this end, in the case of the EP/SA, 100 MT of premixed EP/SA impregnating resin were heated to 50° C. and treated with 0.4 MT bis(tertiary-butyl peroxiisopropyl)-benzol (2 percent, referred to the adhesive resin). Subsequently, 20 MT adhesive resin were added at 50° C. while stirring. The resin mixture was then predegassed by about 50 mbar in a vacuum drying cabinet and cast into standard rod forms preconditioned at 80° C. for 16 hours. The cast standard rod forms were once more degassed briefly in the vacuum drying cabinet and the hardening process was subsequently performed.

In the case of the EP/IC impregnating resin, 100 MT of the premixed resin was degassed at 50° C. in a vacuum. After cooling to room temperature, 0.4 MT bis(-tertiary)-butylperoxiisopropyl)-benzol and 2 MT adhesive resin was added to the resin while stirring, and then, the resin mixture was cast into standard rod forms, preconditioned accordingly, and hardened accordingly.

From Table 4, the composition of the impregnating resins and the hardening conditions as well as the Martens temperature of the molded materials, which were determined on Dynstat samples, can be seen.

TABLE 4

| Adhesive Resin No. | Impregnating Resin | Martens Temperature in degrees C. |
|---|---|---|
| 1 | EP/SA[1] | 124 |
| 2 | EP/SA[1] | 120 |
| 4 | EP/SA[1] | 119 |
| 4 | EP/IC[2] | 172 |

[1]Impregnating Resin Composition: Bisphenol A-Diglycidyl ether/methyl hexahydrophthalic acid anhydride: hardening comditions: 2 hours 80° C., 16 hours 130° C., 16 hours 160° C.
[2]Impregnating Resin Composition: Bisphenol A-Diglycidyl ether/Diphenyl methane diisocyanate (EP:IC = 1:1) hardening conditions: 4 hours 20° C., 8 hours 140° C., 16 hours 200° C.

EXAMPLE 4

Storage of Insulating Tapes

For investigating the storability or storage stability of insulating tapes according to the invention, insulating tapes, prepared by using impregnating resin No. 1; on the basis of glass silk/mica were stored under different conditions. The soluble share was then determined by extraction with acetone. The results of the extraction are summarized in Table 5.

TABLE 5

| Storage Time | Soluble Share in Percent | Insoluble Share in Percent |
|---|---|---|
| 7 Months at room temperature | 71 | 29 |
| 7 Months at +5° C. | 89 | 11 |
| 12 Months at room temperature | 67 | 33 |
| 12 Months at −18° C. | 69 | 31 |

What is claimed is:

1. Insulating tape for making an insulating sleeve for electric conductors impregnated with an epoxy impregnating resin in the form of a heat-hardening reaction resin mixture, comprising an inorganic breakdown-proof material bonded to a flexible base by means of a mixture of a bonding agent and an accelerator, said accelerator for stimulating hardening of the impregnating resin, and said mixture of bonding agent and accelerator forming a system which is self-hardening at the hardening temperature of the impregnating resin, wherein the mixture of bonding agent and accelerator is a mixture of an epoxy resin/(meth)acrylic acid adduct, a bismaleimide resin and an adduct of a secondary amine and a polyfunctional (meth)acrylic acid ester.

2. Insulating tape according to claim 1 wherein the mixture of bonding agent and accelerator further includes an organic peroxide.

3. Insulating tape according to claim 1 wherein the inorganic breakdown-proof material is selected from the group consisting of mica leaves and fine mica layers.

4. Insulating tape according to claim 1, wherein the epoxy resin is a novolak epoxy resin.

5. Insulating tape according to claim 1, wherein the bismaleimide resin has an aromatic grouping between the imide-nitrogen atoms.

6. Insulating tape according to claim 5 wherein the aromatic grouping is N.N'-methylenedi-p-phenylene)-bismaleimide.

7. Insulating tape according to claim 1 wherein the adduct of secondary amine and polyfunctional (meth)acrylic acid ester has free (meth)acrylate functions.

8. Insulating tape according to claim 1 wherein the secondary amine is selected from the group consisting of an NH-functional imidazole, an N-alkyl piperazine and morpholine.

9. Insulating tape according to claim 1 wherein the polyfunctional (meth)acrylic acid ester is trimethylol propane tri(meth)-acrylate.

10. Insulating tape according to claim 1 wherein the epoxy resin/(meth)acrylic acid adduct is 30 to 70 percent by weight of the mixture of bonding agent and accelerator, the bismaleimide resin is 5 to 30 percent by weight of said mixture, and the adduct of secondary amine and polyfunctional (meth)acrylic acid ester is 5 to 50 percent by weight of said mixture.

11. Insulating tape according to claim 2 wherein the organic peroxide is bis(tertiary-butyl peroxiisopropyl)-benzol.

12. Insulating tape according to claim 2 wherein the peroxide content of the mixture of bonding agent and accelerator is 0.1 to 6 percent by weight of the mixture.

13. Insulating tape according to claim 1 wherein the mixture further includes a trimethylol propane tri(meth)acrylate reactive thinner.

14. Insulating tape according to claim 2, wherein the epoxy resin is a novolak epoxy resin.

15. Insulating tape according to claim 4 wherein the bismaleimide resin has an aromatic grouping between the imide-nitrogen atoms which is N.N'-(methylenedi-p-phenylene)-bismaleimide.

16. Insulating tape according to claim 15 wherein the adduct of secondary amine and polyfunctional (meth)acrylic acid ester has free (meth)acrylate functions.

17. Insulating tape according to claim 16 wherein the secondary amine is a NH-functional imidazole, an N-alkyl piperazine or morpholine.

18. Insulating tape according to claim 17 wherein the polyfunctional (meth)acrylic acid ester is trimethylol propane tri(meth)-acrylate.

19. Insulating tape according to claim 18 wherein the epoxy resin/(meth)acrylic acid adduct is 30 to 70 percent by weight of the mixture of bonding agent and accelerator, the bismaleimide resin is 5 to 30 percent by weight of said mixture, and the adduct of secondary amine and polyfunctional (meth)acrylic acid ester is 5 to 50 percent by weight of said mixture.

* * * * *